April 22, 1969   J. T. SEGO, JR   3,440,406

RETRACTABLE ELECTRIC BURNER

Filed July 5, 1967

James T. Sego, Jr.
INVENTOR.

BY
William S. Dorman
ATTORNEY

United States Patent Office 3,440,406
Patented Apr. 22, 1969

3,440,406
RETRACTABLE ELECTRIC BURNER
James T. Sego, Jr., Rte. 2, Tahlequah, Okla. 74464
Filed July 5, 1967, Ser. No. 651,276
Int. Cl. H05b 3/68
U.S. Cl. 219—444     9 Claims

ABSTRACT OF THE DISCLOSURE

An electric heating element for a cook stove reciprocally supported within the stove in a manner whereby the heating element is automatically elevated when electric current is applied thereto for facilitating support of and supplying heat to a cooking vessel in the usual manner, and the heating element is automatically lowered upon cessation of electric current thereto for removing the element from contact with the cooking vessel.

---

This invention relates to improvements in heating elements for cook stoves and more particularly, but not by way of limitation, to a reciprocal electrical heating element which automatically retracts within a recess upon interruption of electrical current thereto.

Electrical cook stoves are in widespread use today and are generally considered to be practical and efficient in the use thereof. However, one particular disadvantage of this type of stove is that the electrical heating elements thereof which transmit heat to the cooking vessels are extremely hot and when the heating element is turned off, it takes a considerable length of time for the heating element to cool off or reduce in temperature. As a result, a cooking vessel which might be left on the turned off heating element may continue to cook the contents and result in burning of the food, or the like. In addition, a turned off element which is still hot may result in serious burn if the element is accidentally engaged by an arm or hand, or the like, of a person.

The present invention contemplates a novel electric heating element for a cook stove wherein the heating element is yieldingly supported in the usual recess or well in the upper surface of the unit or stove. When the particular heating element is "turned on" or supplied with electric current in the usual manner for heating a cooking vessel, the heating element is automatically elevated or raised within the well to a position substantially flush with the upper surface of the stove. The cooking vessel may be disposed on the exposed upper portion thereof in the usual manner during the required heating or cooking time period. As soon as the flow of electric current to the heating element is interrupted or stopped the electric heating element is automatically retracted or lowered within the recess or well whereby the heating element is removed from engagement with the cooking vessel. Of course, suitable support means is provided at the upper end of the recess or well for supporting the cooking vessel as the heating element is retracted. Since the heating element is moved away from the cooking vessel, there will be no continued heating of the vessel subsequent to the desired cooking time period. Thus, an "instant off" is provided for the electric cooking stove, and in addition, accidental burning of the hands or arms, or the like, of the person using the stove is greatly reduced.

It is an important object of this invention to provide a novel electric heating element for a cook stove which is particularly designed and constructed for substantially eliminating inadvertent overheating of cooking vessels, or the like, by providing an "instant off" for the heating element.

It is another object of this invention to provide a novel electrical heating element for a cook stove which is reciprocally disposed therein for automatic reciprocation upon the supply and cessation of electrical current to the heating element.

Another object of this invention is to provide a novel heating element for a cook stove which is supported within a recess therein and adapted for automatic elevation within the recess upon the supply of electric current to the heating element whereby the heating element may direct heat to a cooking vessel, or the like.

Still another object of this invention is to provide a novel heating element for a cook stove which is automatically retracted or lowered from the proximity of a cooking vessel, or the like, upon the cessation of the flow of electric current to the heating element to provide an "instant off" for the cook stove.

A further object of this invention is to provide a novel heating element for a cook stove which is simple and efficient in operation and economical and durable in construction.

Other and further objects and advantageous features of the present invention will hereinafter more fully appear in connection with a detailed description of the drawings in which.

Figure 2:
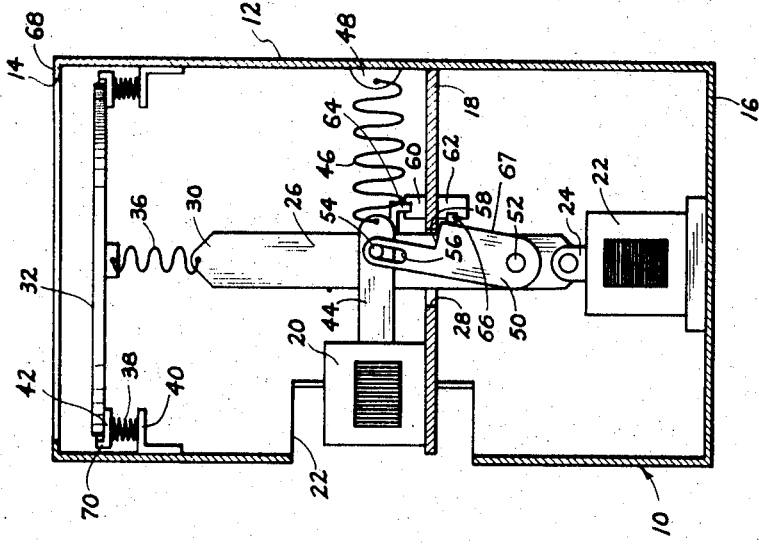
FIGURE 2 is a view similar to FIGURE 1 depicting the heating element in a retracted or lowered position.

Referring to the drawings in detail, reference character 10 generally indicates a heating unit comprising a housing 12 adapted to be suitably disposed or installed within a well or recess (not shown) on a cook stove or the like (not shown). The housing 12 may be of cylindrical cross sectional configuration, if desired, but is not limited thereto and is provided with one open end 14 and one closed end 16 for a purpose as will be hereinafter set forth. A substantially centrally disposed transverse partition or plate member 18 is provided within the housing 12 and secured therein in any suitable manner (not shown) for supporting a first electromagnet 20 thereon. A recess or cut away portion 22 may be provided in the sidewall or the housing 12 to permit access to the plate 18 and to the interior of the housing 12 for facilitating securing or installing of the electromagnet 20 thereon.

A second electromagnet 22 is suitably mounted within the housing 12 on the closed end 16 thereof and is preferably substantially centrally disposed thereon. The electromagnet 22 is provided with the usual reciprocal arm member 24 which is secured at the outer end to a longitudinally extending rod or arm member 26 whereby the arm 26 reciprocates simultaneously with the ram 24 as will be hereinafter set forth in detail. The arm 26 extends longitudinally within the housing 12 and through a substantially centrally disposed aperture 28 provided in the plate 18. The outer extremity or upper end 30 of the arm 26 as viewed in the drawings is connected with an electrical heating element 32 in any suitable manner. The heating element 32 may be of any conventional type and as depicted herein is provided with a downwardly extending centrally disposed lug 34 having one end of a relatively strong helical spring 36 secured thereto. The opposite end of the spring 36 is anchored or secured to the upper end 30 of the arm 26 thus securing the arm 30 to the heating element 32. Of course, the end 30 of the arm 26 may be secured directly to the flange or lug 34 or otherwise secured directly to the heating element 32 as desired. However, it has been found that the resiliency or yieldability provided by the spring 36 is advantageous or of benefit in the overall operation of the heating unit 10.

The heating element 32 is carried or supported by a plurality of circumferentially spaced yieldable elements or spring members 38. The spring members 38 are each disposed on individual inwardly directed bracket members 40 with the bracket members 40 being secured to the inner periphery of the housing in circumferentially spaced relationship. It is preferable to provide four of the springs 38 and supporting brackets 40, but it is to be understood that substantially any desired number thereof may be provided. The upper end of each spring 38 may be secured to the heating element 32 in any suitable manner and as depicted herein each spring 38 is fastened to or suitably secured to a lug member 42 carried by or secured to the heating element 32.

When the arm 26 is reciprocated by the activation of the electromagnet 22 as will be hereinafter set forth, the heating element 32 will be lowered against the pressure of the springs 38. When the electromagnet 22 is de-activated, the heating element is elevated by the spring pressure and is supported in the raised position by the springs 38.

The electromagnet 20 is generally similar to the electromagnet 22 and is provided with the usual reciprocal arm member 44 which extends transversely or radially within the housing 12 and is reciprocated by the electromagnet 20 in the usual manner. The outer end of the arm 44 is connected with one end of a suitable return spring 46 and the opposite end of the spring 46 is secured or anchored to an inwardly directed flange 48 provided on the inner periphery of the housing 12 for a purpose as will be hereinafter set forth. A pivotal lock arm 50 is pivotally secured at 52 to the arm 26 and extends upwardly through the aperture 28 into connection with the arm 44 in any suitable manner. As shown herein, an outwardly extending pin 54 carried by the arm 44 extends through an elongated slot 56 provided in the outer end of the arm 50 and is slidable therein. The arm 52 is also provided with a cut away portion along one edge thereof forming a shoulder 58 engageable with the plate 18 in the lowered position of the arm 26 to provide a locking engagement between the arm 50 and plate 18 for a purpose and as will be hereinafter set forth.

Figure 1:
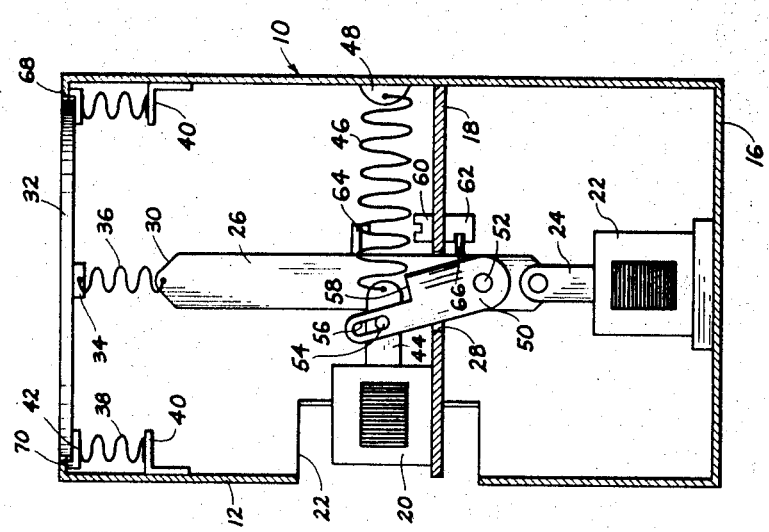
FIGURE 1 is a sectional elevational view of an electrical heating unit embodying the invention with the heating element depicted in an elevated or raised position.

Upper and lower breaker points 60 and 62 of any suitable type are secured to the upper and lower surfaces, respectively, of the plate 18 in the proximity of the aperture 28. A contact member 64 is carried by the arm 26 and engages the breaker point 60 in the lower position of the arm 26 as particularly shown in FIGURE 2. A similar contact point 66 is provided on one edge of the breaker point 62 and is suitably reciprocally mounted therein in a resilient manner generally similar to a push button type doorbell. When the contact 66 is depressed with respect to the breaker point 62 as shown in FIGURE 2, the breaker point 62 is opened and when the contact 66 is in extended position as shown in FIGURE 1, the breaker point 62 is closed. The side edge 67 of the arm 50 engages the contact 66 in the locked position of the arm for depressing the contact 66 and opening the breaker point 62.

The open end 14 of the housing 12 is preferably provided with an inwardly directed circumferential flange 68 which functions as a permanent or fixed support for a cooking vessel, or the like (not shown) as will be hereinafter set forth. In addition, the flange 68 cooperates with an upwardly extending leg portion 70 of each lug member 42 for limiting the upward movement of the heating element 32. It is preferable that the inner diameter of the flange 68 be slightly greater than the outer diameter of the heating coil or element 32 in order to provide clearance for the element 32 during reciprocation thereof. In addition, it is preferable that the flange 68 and leg members 70 cooperate for limiting the upward movement of the element 32 in such a manner that the upper surface of the element 32 is substantially coplanar with the plane surface determined by the exposed surface of the flange 68 when the element 32 is in the uppermost position thereof, as shown in FIGURE 1. Of course, a centrally disposed support post or support member (not shown) may be provided for cooperating with the flange 68 to support the cooking vessel, if desired.

Figure 3:
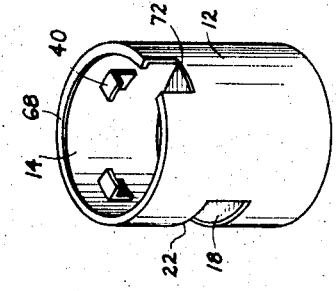
FIGURE 3 is a small perspective view of the housing portion of an electrical heating unit embodying the invention.

The heating element 32 may be of any standard or well known type, and a cut away portion or recess 72 (FIGURE 3) may be provided in the housing 12 whereby the usual electrical connections (not shown) between the element 32 and electrical current source may be provided. This type of connection is well known and is not shown herein, but may be of any suitable or desired type now in use in combination with electrical heating elements in a cook stove, or the like. In addition, the electromagnets 20 and 22 are suitably electrically connected with the electrical current source whereby the electromagnet 20 is activated when the heating element 32 is "turned on" or supplied with a flow of electrical current, and the electromagnet 22 is activated when the element 32 is "turned off."

*Operation*

When the heating element 32 is "turned off," or when no electrical current is being supplied to the heating element 32, the element 32 is normally in a lowered position as shown in FIGURE 2. The return spring 46 constantly urges the arm 44 in a right hand direction as shown in the drawings whereby the pivotal arm 50 is held in such a position that the shoulder 58 thereof engages the plate 18 at the edge of the aperture 28. The arm 26 is thus locked in the lowered position for retaining the element or heating coil 32 in the lowered position against the action of the springs 38. The upper surface of the element 32 is thus normally retained below the plane determined by the flange 68, and at a position within the housing 12 and spaced below the upper end 14 thereof.

When the heating coil 32 is "turned on" by directing electrical current thereto in the usual manner, such as by manual operation of the proper control switch (not shown) of the cook stove (not shown), the electromagnet 20 is energized or activated whereby the arm 44 is immediately pulled in a left hand direction as viewed in the drawings, or to a retracted position with respect to the electromagnet 20. The left hand movement of the arm 44 pivots the arm 50 in a counterclockwise direction about the pivot connection 52 for disengaging the shoulder 58 from the plate 18. This releases the arm 26 whereby the springs 38 move the element 32 upwardly until the legs 70 engage the flange 68 as shown in FIGURE 1. The heating element is retained or supported in this raised position by the springs 38 as long as the electrical power is applied to the coil 32.

Of course, the breaker points 60 and 62 are suitably operably connected in the electrical circuit of the cook stove for cooperation with the breaker points 60 and 62, as is well known. As the arm 26 moves upwardly, the contact member 64 is raised simultaneously therewith for disengaging the breaker point 60 whereby the electromagnet 20 is deactivated.

The cooking vessel (not shown) is supported by the upper surface of the heating coil 32 and the flange 38 during the cooking or heating period, as is well known. In addition, it will be readily apparent that the uppermost position of the heating coil 32 may be limited in such a manner that the cooking vessel will be supported by the flange 68 only, with the upper surface of the heating coil being spaced slightly below the vessel whereby the heating of the vessel will be through a radiation method rather than through direct contact.

When the flow of electrical current to the heating element 32 is interrupted, or when the coil 32 is "turned off" by the usual manipulation of the control switch, or for any other reason, the electromagnet 22 is energized or activated whereby the arm 24 is retracted or pulled downwardly as viewed in the drawings. The arm 26 moves downwardly simultaneously with the arm 24 for pulling the heating element 32 downwardly away from the open end 14 of the housing 12 and against the pressure or force of the springs 38 to the position shown in FIGURE 2. The downward movement of the arm 26 is relatively rapid due to the vigorous action of the electromagnet, as is well known. The cushioning action of the spring 36 provides a shock absorbing feature for the heating coil 32 to reduce the violence of the action of the electromagnet as the coil 32 is pulled downwardly.

When the arm 26 is in the lowered position, the return spring 46 pulls the arm 44 in a right hand direction as viewed in the drawings. This locks the shoulder 58 with the plate 18 as shown in FIGURE 1 and locks the arm 26 in the lowered position. Also, the contact member 66 is brought into engagement with the breaker point 62 for opening the breaker point 62 and deactivating the electromagnet 22. The unit 10 remains in this condition until the flow of electrical current is restored to the heating element 32, whereupon the cycle is repeated.

The heating coil 32 is lowered from engagement with a cooking vessel, or the like, substantially immediately upon the cessation of the flow of electrical current to the heating element, thus providing an "instant off" for the electrical heating element. Conversely, the heating element 32 is raised substantially instantaneously upon the application of electrical current thereto whereby the unit 10 may be utilized in the normal manner for heating or cooking.

From the foregoing it will be apparent that the present invention provides a novel electric heating unit for a cook stove or the like wherein an "instant off" is provided for the electrical heating element of the unit. When the heating element is activated by the usual control switch, or the like, for directing a flow of electrical current thereto, the heating element is automatically elevated to a position adjacent to or in the proximity of a cooking vessel, or the like, which is to be heated by the unit. The heating element is retained in the heating position until such time that the flow of electrical current thereto is interrupted, such as by turning off the control switch, whereupon the heating element is automatically retracted to a position away from the vessel, thus ceasing the heating thereof. Of course, the heating element may be reciprocally supported within the housing in any suitable manner, such as by a pulley, cable and weight arrangement, whereby the heating element may be lowered against the force of the support means, and automatically raised when the downward acting force or pressure is released. The novel electrical heating unit is simple and efficient in operation and economical and durable in construction.

Changes may be made in the combination and arrangement of parts as heretofore set forth in the specification and shown in the drawings, it being understood that any modification in the precise embodiment of the invention may be made within the scope of the following claims, without departing from the spirit of the invention.

What is claimed is:

1. An electrical heating unit comprising a housing, a heating element reciprocally disposed within the housing, yieldable means disposed within the housing for supporting the heating element, means connected with the heating element for retracting the heating element during periods of non-use, locking means for retaining the heating element in the retracted position thereof, and means for releasing the locking means whereby the yieldable means elevates the heating element during periods of use.

2. An electrical heating unit as set forth in claim 1 wherein the releasing means is automatically activated upon the flow of electrical current to the heating element, and the retracting means is automatically actuated upon the cessation of the flow of electrical current to the heating element.

3. An electrical heating unit as set forth in claim 1 wherein the yieldable support means comprises a plurality of spring members carried by the housing and engageable with the heating element for supporting the heating element within the housing.

4. An electrical heating unit as set forth in claim 1 wherein the retracting means comprises an electromagnet activated upon cessation of the flow of electric current to the heating element, reciprocal arm means operably connected between the heating element and the electromagnet and retractable upon activation of the electromagnet for retracting the heating element during said periods of non-use.

5. An electrical heating unit as set forth in claim 1 wherein the releasing means comprises an electromagnet activated upon the application of electrical current to the heating element and deactivated upon elevation of the heating element, and reciprocal arm means operably connected between the locking means and electromagnet for releasing the locking means upon the activation of the electromagnet and re-engaging the locking means upon deactivation of the electromagnet.

6. An electrical heating unit comprising a housing, a heating element reciprocally disposed within the housing, a plurality of yieldable members carried by the housing for supporting the heating element, first electromagnet means activated upon the application of electrical current to the heating element, second electromagnet means activated upon the cessation of electrical current to the heating element, means connecting said second electromagnet means with the heating element whereby the heating element is retracted upon activation of the second electromagnet means, locking means for retaining the heating element in the said retracted position during periods of non-use, means operably connecting said first electromagnet means with the locking means whereby the locking means is released upon the activation of the first electromagnet whereupon the yieldable members elevate the heating element to an operable position within the housing and the locking means is re-engaged upon the retraction of the heating element.

7. An electrical heating unit as set forth in claim 6 wherein the yieldable members comprise a plurality of spaced spring members.

8. An electrical heating unit as set forth in claim 6 wherein the means connecting said second electromagnet means with the heating element comprises an arm member connected between the heating element and the second electromagnet for retraction upon activation of the second electromagnet whereby the heating element is retracted against the action of the yieldable members, and the yieldable members elevate the heating element and arm member upon deactivation of the second electromagnet.

9. An electrical heating unit as set forth in claim 6 wherein the means connecting the first electromagnet means with the locking means comprises a reciprocal arm connected with the locking means and retractable upon activation of the first electromagnet means whereby the locking means is released, and return spring means connected between the housing and the reciprocal arm for extending the arm subsequent to deactivation of the first electromagnet means whereby the locking means is re-engaged.

References Cited

UNITED STATES PATENTS 1,102,392   7/1914   Denhard _____ 219—456

BERNARD A. GILHEANY, *Primary Examiner.*

F. E. BELL, *Assistant Examiner.*

U.S. Cl. X.R.

219—456